US009532418B2

(12) United States Patent  (10) Patent No.: US 9,532,418 B2
van den Broeke et al.  (45) Date of Patent: Dec. 27, 2016

(54) SWITCHED MODE POWER SUPPLY

(71) Applicant: Silergy Corp.

(72) Inventors: Leendert van den Broeke, Nijmegen (NL); Ewold van Geffen, Nijmegen (NL); Frank Schoofs, Nijmegen (DE)

(73) Assignee: Silergy Corp., Cayman Islands (GB)

( * ) Notice: Subject to any disclaimer, the term of this patent is extended or adjusted under 35 U.S.C. 154(b) by 0 days.

(21) Appl. No.: 14/713,982

(22) Filed: May 15, 2015

(65) Prior Publication Data

US 2015/0359052 A1    Dec. 10, 2015

(30) Foreign Application Priority Data

Jun. 6, 2014 (EP) .................................... 14171606

(51) Int. Cl.
*H05B 33/08* (2006.01)
*H02M 3/156* (2006.01)
*H02M 3/335* (2006.01)

(52) U.S. Cl.
CPC ......... *H05B 33/0815* (2013.01); *H02M 3/156* (2013.01); *H02M 3/33507* (2013.01); *H05B 33/0845* (2013.01); *Y02B 20/346* (2013.01)

(58) Field of Classification Search
CPC . H05B 33/0815; H05B 33/0845; H02B 3/156; H02N 3/33507; H02M 3/156; H02M 3/33507

See application file for complete search history.

(56) References Cited

U.S. PATENT DOCUMENTS

| 2009/0160369 A1 | 6/2009 | Godbole et al. | |
| 2012/0139433 A1* | 6/2012 | Yan | H05B 33/0815 315/206 |
| 2014/0062319 A1* | 3/2014 | Huang | H05B 33/0815 315/186 |

FOREIGN PATENT DOCUMENTS

| EP | 2 440 020 A1 | 4/2012 |
| EP | 2 533 606 A1 | 12/2012 |

OTHER PUBLICATIONS

Extended European Search Report for EP Patent Appln. No. 14171606.8 (Aug. 21, 2014).

* cited by examiner

*Primary Examiner* — Tung X Le
*Assistant Examiner* — Raymond R Chai

(57) ABSTRACT

A switched mode power supply comprising: a rectified voltage terminal and a rectified ground terminal for receiving a phase-cut rectified voltage; a power switch and an inductive element connected in series between the rectified voltage terminal and the rectified ground terminal; a switch controller having a floating ground terminal and a dimming input terminal, wherein the dimming input terminal is for receiving a dimming voltage signal indicative of a required dimming level, wherein the switch controller is configured to control the switch in accordance with the dimming voltage signal and wherein the inductive element is connected between the rectified ground terminal and the floating ground terminal; and a dimming level controller configured to set the dimming voltage signal in accordance with the rectified phase-cut voltage with respect to the floating ground terminal.

13 Claims, 6 Drawing Sheets

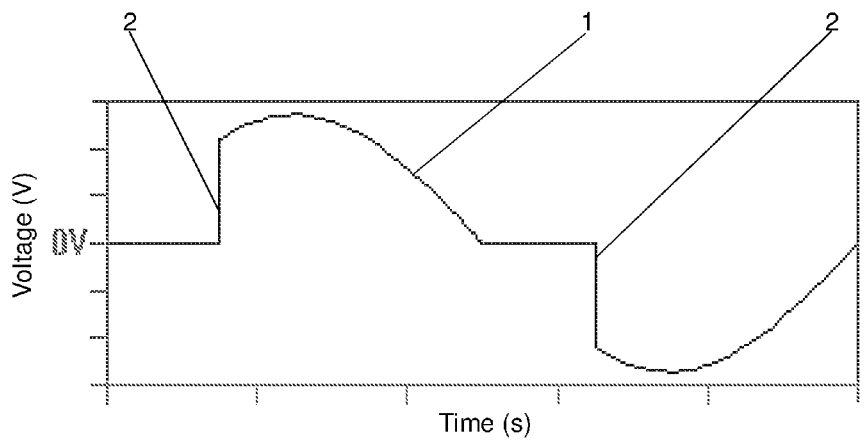
Figure 1a (conventional)
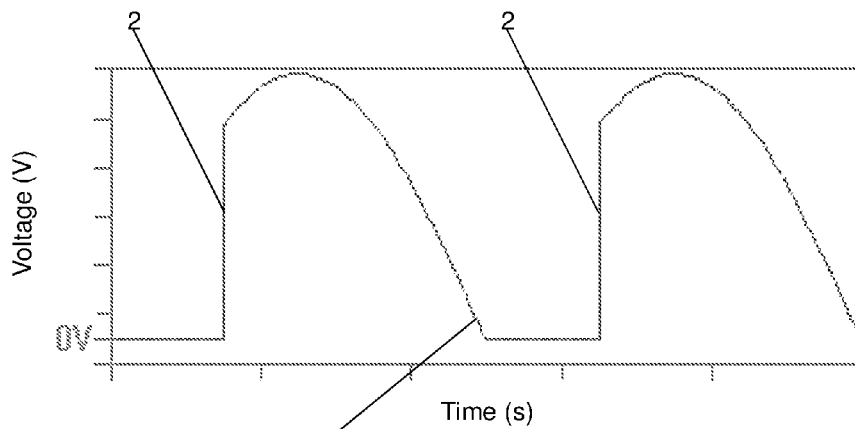
Figure 1b (conventional)

Figure 2

SWITCHED MODE POWER SUPPLY

CROSS-REFERENCE TO RELATED APPLICATIONS

This application claims the priority under 35 U.S.C. §119 of European patent application no. 14171606.8, filed on Jun. 6, 2014, the contents of which are incorporated by reference herein.

This disclosure relates to switched mode power supplies and in particular, although not exclusively, to buck-boost and flyback converters for dimmable solid state lighting applications.

Phase cut dimmers are widely used in a range of applications, including but not limited to lighting applications. A phase-cut dimmer uses a switch to switch off or "cut" part of the mains cycle—or more accurately, half-cycle.

FIG. 1a illustrates a leading edge phase-cut mains voltage signal 1 against time over one AC cycle (typically 0.02 s for a 50 Hz supply or about 0.17 s for a 60 Hz supply). The phase angle of the cut 2 determines an amount of energy that is lost from the AC mains voltage. Either the leading or trailing edge, or even both edges of the phase can be cut, depending on the type of switch used. For a trailing edge phase-cut dimmer the waveform would be mirrored along the voltage axis shown in FIG. 1a, but the average voltage would be the same as for the leading edge phase-cut mains voltage signal 1. FIG. 1b illustrates a rectified signal 3 that corresponds to the phase-cut mains voltage signal 1. Normally either a transistor or a triac is used to cut the mains voltage signal and a bridge rectifier may be used to rectify the signal.

Although this method of dimming control can be effective for conventional incandescent lighting, phase-cut dimmers can cause problems when used with more energy efficient types of lighting, such as compact fluorescent lights (CFL), tube lighting (TL), or solid-state lighting (SSL), which are not well suited to cope with the "missing" parts of the mains cycle. Such energy efficient types of lighting are often controlled by means of a switched mode power supply, with switches that operate at frequencies much higher than that of either a 50 Hz or 60 Hz mains cycle—typically several kHz up to several MHz.

For phase cut dimmers to be compatible with such types of lighting, the phase cut power needs to be processed to be usable by the lighting circuit. However, it is important that in such processing, the information regarding the desired level of dimming, which is included in the phase cut signal, is recovered as a dimming control level signal.

According to a first aspect of the present invention there is provided a switched mode power supply comprising:
- a rectified voltage terminal and a rectified ground terminal for receiving a phase-cut rectified voltage;
- a power switch and an inductive element connected in series between the rectified voltage terminal and the rectified ground terminal;
- a switch controller having a floating ground terminal and a dimming input terminal, wherein the dimming input terminal is for receiving a dimming voltage signal indicative of a required dimming level, wherein the switch controller is configured to control the switch in accordance with the dimming voltage signal and wherein the inductive element is connected between the rectified ground terminal and the floating ground terminal; and
- a dimming level controller configured to set the dimming voltage signal in accordance with the rectified phase-cut voltage with respect to the floating ground terminal.

The dimming voltage signal may be provided with reference to the floating ground. The dimming level controller may be configured to set the dimming voltage signal as an average of a portion of the rectified phase-cut voltage with respect to the floating ground terminal over one or more half cycles of the phase-cut rectified voltage.

The switched mode power supply may further comprise a potential divider with a first divider resistor and a second divider resistor. The potential divider may be connected in series between the rectified phase-cut voltage terminal and the floating ground terminal. The dimming voltage signal may be available at a node between the first divider resistor and the second divider resistor. The switched mode power supply may further comprise a Zener diode and an averaging capacitor connected in series between the rectified phase-cut voltage terminal and the floating ground terminal. The averaging capacitor having a first plate and a second plate. The second plate may be connected to the floating ground terminal. The first plate may be connected to the Zener diode via the first divider resistor. The first plate may be connected to the first divider resistor. The first divider resistor may be provided in series with, and between, the Zener diode and the averaging capacitor. The second divider resistor may be connected in parallel with the averaging capacitor. The first plate may be configured to provide the dimming voltage signal.

The switched mode power supply may further comprise a bias capacitor with a first plate and a second plate. The first plate of the bias capacitor may be connected to a junction between the Zener diode and the first divider resistor. The second plate of the bias capacitor may be connected to the rectified ground terminal.

The average dimming voltage signal may be $$V_{dimavg} = \sqrt{2} \cdot V_{mains} \cdot \frac{R_{div1}}{R_{div1} + R_{div2}} \cdot \frac{\cos\varphi - \cos\pi - \alpha}{\pi} - \frac{\pi - \alpha - \varphi \cdot \frac{V_Z + 2 \cdot V_D + V_{ESR}}{\sqrt{2} \cdot V_{mains}}}{\pi}$$

where $$\alpha = \sin^{-1} \frac{V_Z + 2 \cdot V_D + V_{ESR}}{\sqrt{2} \cdot V_{mains}},$$

$\alpha \leq \varphi \leq 180$, $\varphi$ represents a dimmer phase cut angle, $V_{mains}$ is a root mean squared line voltage at the input terminals, $V_D$ is a voltage dropped by a bridge rectifier, $V_Z$ is a Zener stand-off voltage and $V_{ESR}$ is the voltage dropped over the inductive element.

The switched mode power supply may comprise an additional resistor connected between the dimming input terminal and a reference voltage in order to provide a fixed offset to the dimming voltage signal.

The switched mode power supply may comprise filtering circuitry connected between the power switch and the rectified voltage terminal. The switched mode power supply may comprise filtering circuitry connected between the rectified voltage terminal and the rectified ground terminal. The filtering circuitry may be configured to prevent electromagnetic noise from the switched mode power supply being added to, or interfering with, the phase-cut rectified voltage at the rectified voltage terminal and the rectified ground terminal.

The inductive element may have a resistance of less than one of 0.5, 1, 2, 5, 10, 20 or 50 ohms. The resistance may be in a range between 0.1 and 20 ohms.

The switched mode power supply may comprise a buck-boost converter.

The switched mode power supply may comprise a flyback converter. The inductive element may be a winding of a transformer of the flyback converter. The inductive element may be a primary winding of the transformer.

The dimming level controller and the switching controller may be provided in a single package. The power switch may also be provided in the single package.

There may be provided a computer program, which when run on a computer, causes the computer to configure any apparatus, including a circuit, controller, switched mode power supply, or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

The computer program may be provided on a computer readable medium, which may be a physical computer readable medium such as a disc or a memory device, or may be embodied as a transient signal. Such a transient signal may be a network download, including an internet download.

According to a further aspect of the invention there is provided a solid state lighting unit comprising any switched mode power supply, SMPS, disclosed herein.

One or more embodiments of the invention will now be described, by way of example only, and with reference to the accompanying figures in which:

FIG. 1a illustrates a phase-cut mains voltage signal;

FIG. 1b illustrates a rectified phase-cut mains voltage signal;

FIG. 2 illustrates a simplified schematic of a low side buck-boost dimmer converter;

Figure 3:
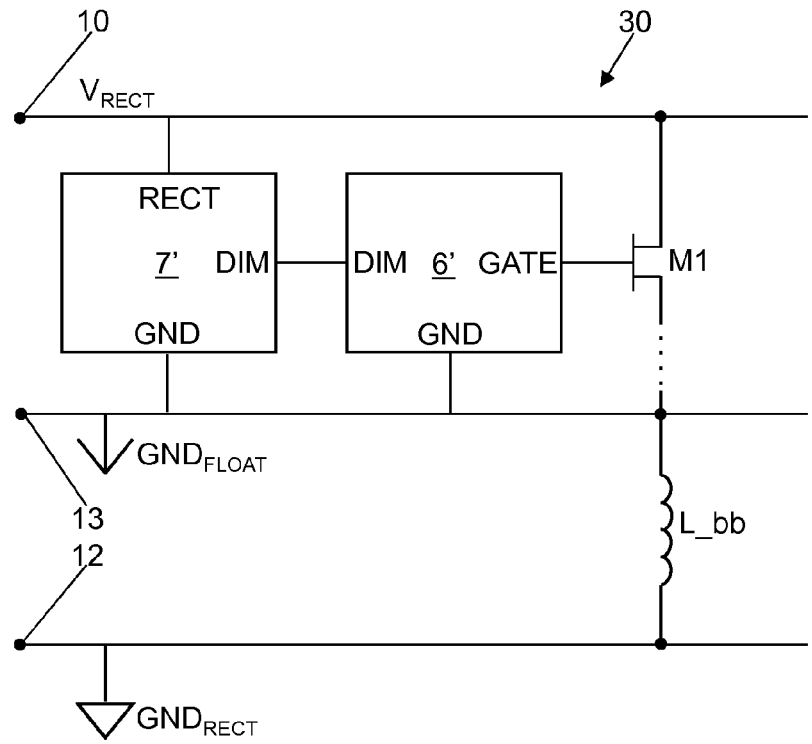
FIG. 3 illustrates a simplified schematic of a portion of a high side buck-boost dimmer converter.

Solid state light sources are an increasingly popular choice for replacing incandescent light sources. The significantly lower energy consumption of many solid state light sources compared to their incandescent counterparts is an important motivating factor for such replacement. However, for a wide variety of applications, the cost of implementing the solution is also an important factor to be minimised or reduced.

For ease of implementation and cost, many of the power supplies for dimmable solid state lighting applications relate to low side drive switching converters. In flyback or buck-boost switched mode power supplies (SMPSs), the output power of the SMPS can be controlled by regulating a duty cycle and switching frequency of a power switch in accordance with a phase-cut rectified mains signal, such as that discussed with reference to FIG. 1b.

Figure 2:
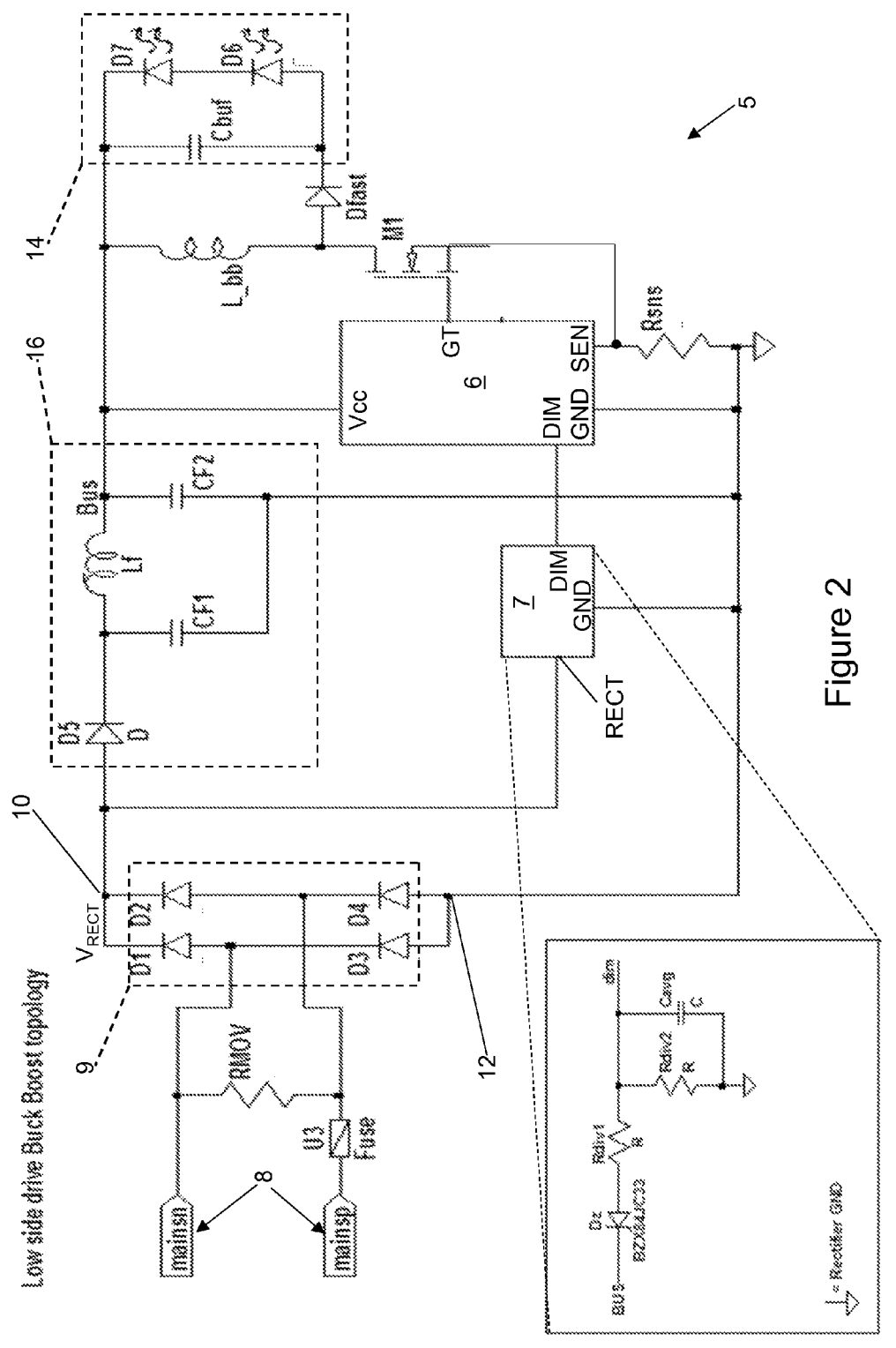

FIG. 2 illustrates a simplified schematic of a low side buck-boost dimmer converter, SMPS 5. The SMPS 5 comprises an inductor L_bb, a power switch M1, a switching controller 6 and a dimming level controller 7. The SMPS 5 is configured to receive a phase-cut mains voltage at mains input terminals 8 of the SMPS 5. The phase-cut mains voltage is converted to a phase-cut rectified voltage $V_{RECT}$ by a rectifier 9.

In this example, a voltage surge protection device such as a transient voltage suppressor in the form of a RMOV (Metal Oxide Varistor) is provided between the mains input terminals 8 of the SMPS 5. Also, a fuse is connected between the mains input terminals 8 and the rectifier 9.

The rectifier 9 is a bridge rectifier having four diodes D1-D4 in a bridge configuration. The bridge configuration of diodes D1-D4 is connected between i) the mains input terminals 8 and ii) a rectified voltage terminal 10 and a rectified ground terminal 12. The phase-cut rectified voltage $V_{RECT}$ is provided by the rectifier 9 at the rectified voltage terminal 10 with respect to a rectified ground at the rectified ground terminal 12.

The power switch M1 is provided by a metal-oxide semiconductor field effect transistor in this example. A conduction channel of the power switch M1 is connected in series with the inductor L_bb. The series arrangement of the power switch M1 and the inductor L_bb connected between the rectified voltage terminal 10 and the rectified ground terminal 12. The inductor L_bb is connected between the rectified voltage terminal 10 and the conduction channel of the power switch M1 because the SMPS 5 is low side driven. That is, in terms of potential, the power switch M1 is lower (closer to rectified ground) than the inductor.

The inductor L_bb is part of a buck-boost loop. The buck-boost loop also comprises a buck-boost diode Dfast and an output element 14. The output element 14 represents a load of the SMPS 5 and comprises a string of LEDs D6, D7 provided in parallel with a buffer capacitor Cbuf. The buck-boost diode Dfast and the output element 14 are connected in series with each other and together in parallel with the inductor L_bb.

The switching controller 6 may be provided by a dimmable SMPS switching controller such as SSL2101, see Product Data Sheet, NXP B.V. "Dimmable GreenChip driver for LED lighting", Rev. 4.1—5 Dec. 2011 available online at http://www.nxp.com/documents/data_sheet/SSL2101.pdf. In this example the switching controller 6 has six terminals, which include:

1) an integrated circuit (IC) ground terminal GND connected to the rectified ground terminal 12;
2) a current sensing terminal SEN connected to the rectified ground terminal 12 via a sense resistor Rsns;
3) an IC voltage terminal Vcc for receiving a supply voltage for the integrated circuit from the rectified voltage terminal 10;
4) a control terminal, GT, for providing a control signal to a gate of the power switch M1;
5) a dimming input terminal DIM (which relates to the brightness pin of SSL2101) for receiving a dimming voltage indicative of a required dimming level; and
6) a boundary conduction mode detection terminal (not shown), for receiving a signal from the inductor L_bb in order for the controller to determine when the energy in the inductor L_bb has reached zero. The boundary conduction mode detection terminal is connected to the drain of the power switch M1.

In order to comply with radiation regulations, an additional filtering circuit 16 is provided between the IC voltage terminal Vcc and the rectified voltage terminal 10. The filtering circuit 16 is configured to block electromagnetic interference from the SMPS 5 returning to the mains supply. The conditioning circuit 16 comprises an optional conditioning diode D5 in series with a conditioning inductor Lf. The rectified voltage terminal 10 is connected to the conditioning diode D5. The IC voltage terminal Vcc is connected to the filtering inductor Lf. A junction between the conditioning diode D5 and a first terminal of the conditioning inductor Lf is connected to the rectified ground terminal 12 via a first conditioning capacitor CF1. A second conditioning capacitor CF2 is connected between a second terminal of the conditioning inductor Lf and the rectified ground terminal 12. It will be appreciated that the circuit shown in FIG. 2 is a simplified example and other components may be provided in addition or as an alternative to the filtering circuit 16 in order to operate the switching controller 6.

The switching controller 6 acts as a switch toggling unit that is configured to toggle the power switch M1 between an open state and a closed state in order to transfer energy from the mains input terminals 8 to the output element 14. The switch toggling unit defines a switching cycle with a primary stroke and a secondary stroke. During the primary stroke, the power switch M1 is closed and energy is stored in the inductor L_bb. In the secondary stroke, the power switch M1 is opened and energy stored in the inductor L_bb is transferred to the output element 14. The switching controller 6 is configured to control the power switch M1 in accordance with the dimming voltage signal in order to provide an output current in accordance with the desired dimming level.

The dimming level controller 7 of the SMPS 5 is configured to set the dimming voltage signal in accordance with the rectified phase-cut voltage with respect to the rectified ground terminal. An example dimming level controller 7 is provided by the circuit shown in a cut away in FIG. 2.

The dimming level controller 7 comprises a Zener diode Dz and a potential divider connected in series between the rectified voltage terminal 10 and the rectified ground terminal 12. The potential divider has a first divider resistor Rdiv1 and a second divider resistor Rdiv2. The first divider resistor Rdiv1 is provided between the Zener diode Dz and the second divider resistor Rdiv2. An averaging capacitor Cavg is connected in parallel with the second divider resistor Rdiv2. The dimming voltage signal is available at a junction/node between the first divider resistor Rdiv1 and the second divider resistor Rdiv2. The dimming voltage signal can be considered as being provided by a first plate of the averaging capacitor Cavg, which is connected to a node between the first divider resistor Rdiv1 and the second divider resistor Rdiv2. A second plate of the averaging capacitor Cavg is connected to the rectified ground terminal 12. The averaging capacitor Cavg averages the phase-cut rectified voltage $V_{RECT}$ with respect to the rectified ground.

A voltage is subtracted from the phase-cut rectified voltage $V_{RECT}$ by the Zener diode Dz because it is arranged so that it is reverse biased, in use. Providing a lower dimming voltage signal at smaller mains voltage phase cut angles can provide lower light output level at small dimmer conduction angles and so a solid state lighting unit may better mimic the behaviour of an incandescent bulb.

The maximum voltage of the dimming input terminal DIM of the controller 6 can be less than 5V. The potential divider is used to further reduce and adapt the phase-cut rectified voltage to the voltage rating of the dimming input terminal DIM of the switching controller 6.

The dimming level controller 7 can be considered to provide an averaging circuit because it is configured to set the dimming voltage signal as an average of a proportion of the rectified phase-cut voltage $V_{RECT}$ with respect to the rectified ground over one or more half cycles of the phase-cut rectified voltage. The average level relates to the integral of the curve shown in FIG. 1b.

In the SMPS 5, the LED string D6, D7 is referenced to the rectified voltage signal (positive output). The switch controller and the dimming level controller 7 are referenced to the rectifier ground. The SMPS 5 therefore provides a simple way to derive the dimming voltage signal from the rectified mains voltage $V_{RECT}$ and a simple interface between the dimming level controller 7 and the switch controller 6.

In order to provide the correct average of the mains input voltage, the dimming level controller 7 is referenced to the rectified ground. Since for the low side switching SMPS 5, the ground terminal of the switching controller 6 is referenced to the same ground (the rectified ground), the interfacing between the switching controller 6 and the dimming level controller 7 is straightforward; the ground terminals of the switching controller 6 and the dimming level controller 7 can be directly connected together.

However, there are some disadvantages of a low side driver design, as listed below.

1. A switching converter may require additional components in order to provide an over-voltage protection circuit to protect the buffer capacitor Cbuf from damage (by exploding, for example) if the LED string D6, D7 for some reason (for example, due to a solder joint failure) forms an open circuit. An auxiliary winding may need to be present to enable the switching controller 6 to sense the over-voltage condition and suspend switching. This additional winding increases the cost of the inductive element.
2. Relatively complex circuitry may be required to accurately regulate the LED output current because, in the low-side driver 5, the output current may have to be determined from a maximum inductor current and a ratio of switching times, with compensation for non-ideal behaviour of the switch (like switching delay).
3. A safety isolation around a heat sink of the LED string must be AC coupled to the rectified ground. In a low side driven system the coupling may be achieved by providing a capacitor between the safety isolation and the rectified ground, which means that an additional component is required by the system.

FIG. 3 illustrates a schematic of a portion of a high side buck-boost dimmer converter (SMPS) 30. The SMPS 30 may be used to provide a solid state lighting unit, for example. The high side driven SMPS 30 can address at least some of the above problems experienced with the low side SMPS of FIG. 2. The advantages and function of the SMPS 30 of FIG. 3 are discussed further below with regard to a specific (simplified) implementation in FIGS. 4 and 5 and another specific implementation with regard to FIGS. 6 and 7.

The SMPS 30 has a switch controller 6', and a dimming level controller 7' a power switch M1 and an inductor L_bb. The inductor L_bb is an example of an inductive element. The dimming level controller and the switching controller may be provided in a single package. The power switch may also be provided in the single package.

The SMPS 30 also has a rectified voltage terminal 10 for receiving a phase-cut rectified voltage signal $V_{RECT}$ and a rectified ground terminal 12 for receiving a rectified ground signal $GND_{RECT}$. In addition to the rectified ground terminal 12, a separate, floating ground terminal 13 is required for the switch controller 6' of a high side implementation in order for the switch controller 6' to drive the power switch M1. The requirement for two separate ground terminals would appear to add a level of additional circuit complexity. However, the arrangement of the components in the SMPS 30 of FIG. 3 enables the switch controller 6' to directly measure the actual inductor current on both the primary and secondary stroke and directly sense the converter output voltage, which is equal to the voltage across the inductor L_bb in the secondary stroke. A resistive divider is used to scale the magnitude of the voltage across the inductor L_bb (for example 20 . . . 200V) to a level that the switch controller 6' can handle (typically a few volts). This topology may mitigate the need for additional level shifting circuits (including current mirrors, opto-couples or transformers, for example). Further details on the operation of such an SMPS are provided below with regard to the specific example of FIG. 4.

The power switch M1 and the inductor L_bb are connected in series between the rectified voltage terminal 10 and the rectified ground terminal 12. The power switch M1 and the inductor L_bb are not necessarily directly connected to one another. The power switch M1 is on the high side, that is, between the inductor L_bb and the voltage terminal 10. The power switch M1 is also not necessarily directly connected to the voltage terminal 10. For example, a filtering circuitry may be provided between the power switch M1 and the voltage terminal 10 in order to prevent high frequency current to travel through the input terminals and so cause electromagnetic interference. Similarly, the inductor L_bb is not necessarily directly connected to the rectified ground terminal 12.

The switch controller 6' has a number of terminals, including:
  a floating ground terminal GND for connecting to the floating ground terminal 13 of the SMPS 30;
  a dimming input terminal DIM for receiving a dimming voltage signal indicative of a required dimming level; and
  a gate terminal GATE for controlling the power switch M1 in accordance with the dimming voltage signal.

The dimming level controller 7' also has a number of terminals, including:
  a rectified voltage terminal RECT for receiving the rectified phase-cut voltage $V_{RECT}$ from the rectified voltage terminal 10 of the SMPS 30;
  a floating ground terminal GND for connecting to the floating ground terminal 13 of the SMPS 30; and
  a dimming output terminal DIM.

The dimming level controller 7' can be considered to be a high side dimmer phase angle detection circuit. The dimming level controller 7' is configured to set the dimming voltage signal at the dimming output terminal DIM in accordance with the rectified phase-cut voltage with output referenced to the floating ground at the floating ground terminal 13, and can operate in a similar way to the dimming level controller described with reference to FIG. 2. The dimming output terminal DIM of the dimming level controller 7' is connected to the dimming input terminal DIM of the switch controller 6' and so the dimming level controller 7' is configured to provide the dimming voltage signal to the dimming input terminal DIM of the switch controller 6'.

The inductor L_bb is connected between the rectified ground terminal 12 and the floating ground terminal 13. As such, the power switch M1 is at a higher potential than the inductor L_bb. An ideal inductor has no resistance. Practical inductors do have a resistance of for example 0.1 to 20 Ohms. In practical designs, this implies that there is a voltage drop between 10 mV and few Volts between the floating ground and the rectifier ground, depending on dimming level, magnitude of LED current and type of inductor used. This voltage is big compared to the voltage range of the dimming control input (for example 0.3 . . . 2V) of switch controller 6 but small compared to the magnitude of the rectified mains voltage (average for example 30 . . . 200V). The inventors have realised that a proper dimming control signal can therefore be derived by making a voltage division from rectified mains with reference to the floating ground: the average voltage drop across the inductor is effectively in series with the rectified input voltage and so has little influence on the average value of divided signal. This can advantageously enable the SMPS 30 to be implemented by relatively few, cost effective components. Also, additional level shifting circuits may not therefore be required.

The connections and operation of a high side SMPS configuration are further described with reference to FIGS. 4 to 7, below. Such SMPSs may provide an easily implemented, cost-effective high side AC phase-cut dimmable solid state light current source.

Figure 4:
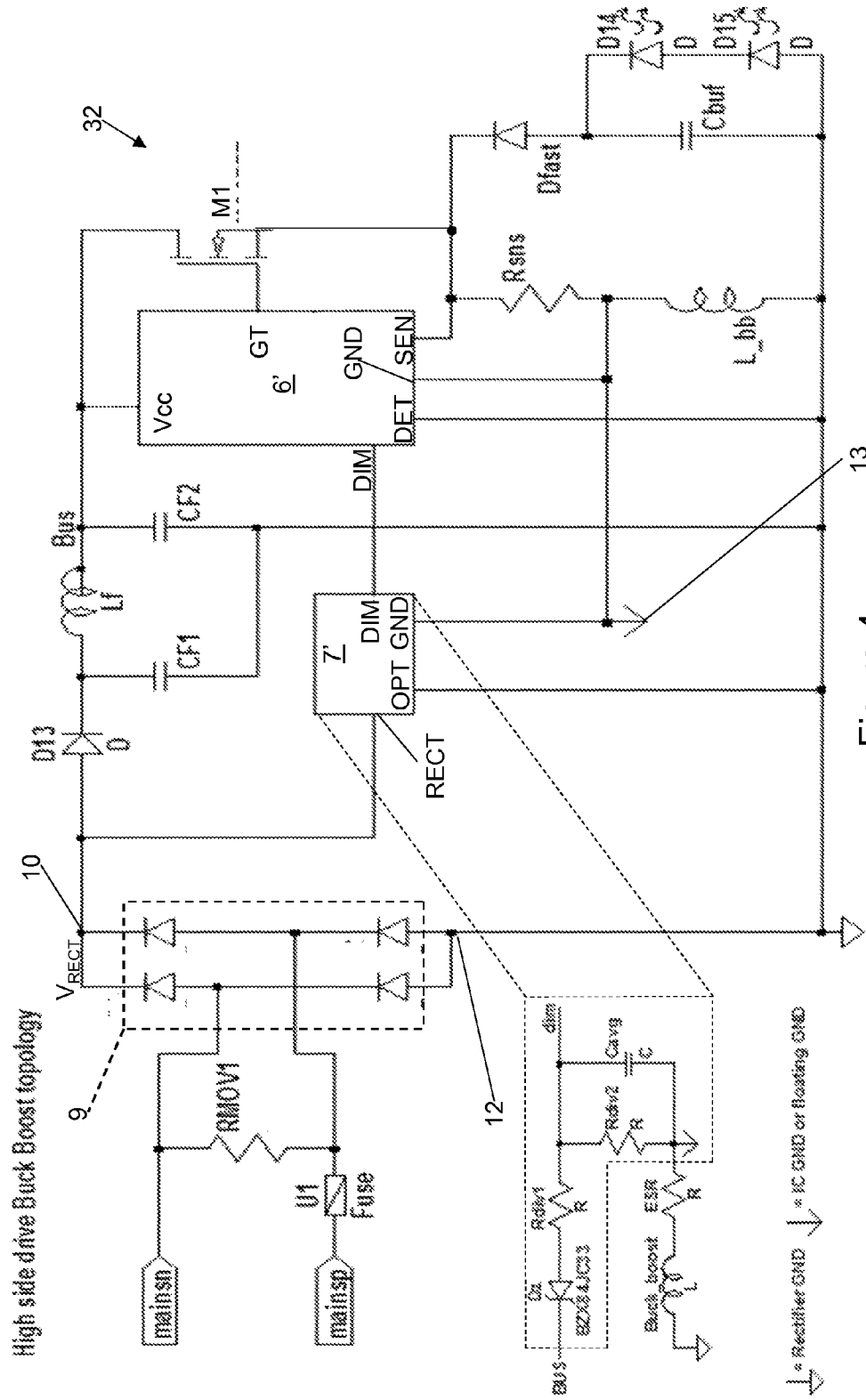
FIG. 4 illustrates a simplified schematic of a high side buck-boost dimmer converter similar to that of FIG. 3.

FIG. 4 illustrates a simplified schematic of a high side buck-boost dimmer converter. Except for two features involving the DET pin and SEN pin as described below, the switching controller 6' itself may be provided by the same circuitry as the switching controller of the low side converter of FIG. 2 and the arrangement of the circuit, other than the connections of the switching controller 6' is similar to that of FIG. 2. The arrangement of the switching controller 6' is similar to that described with reference to FIG. 3. These components will therefore not necessarily be described again here.

The IC ground terminal GND of the switching controller 6' is connected to the floating ground terminal 13, rather than the rectified ground terminal 12 compared to the low side converter of FIG. 2.

A boundary conduction mode detection terminal DET is provided separately from the IC ground terminal GND in this example. The boundary conduction mode detection is sensing the voltage across the inductor.

In this example, the buck-boost loop comprises a sense resistor Rsns. The sense resistor Rsns is connected in series between the buck-boost diode Dfast and the inductor L_bb. The sense terminal SEN of the switching controller 6' is connected to the junction/node between sense resistor Rsns and the buck-boost diode Dfast. The inductor L_bb is connected between the rectified ground terminal 12 and the floating ground terminal 13. By measuring the average voltage across Rsns only during the secondary stroke, the switch controller can easily determine the actual current through the load and adjust the switch on-time to match the output current with the voltage provided to the dimming input terminal DIM.

The LED string D14, D15 is connected in series between the buck-boost diode Dfast and the rectified ground terminal 12. In this example an anode plate of the LEDs D14, D15 may be directly connected to a safety isolation of a heat sink of the LED string D14, D15 in order to connect the isolation to rectified ground. An additional capacitor used to provide the connection in a low side driven circuit may not be required due to the high side topology because the anode of the LED string D14, D15 is referenced to the rectified ground.

The power switch M1 and the inductor L_bb are connected in series with the sense resistor Rsns between the rectified voltage terminal 10 and the rectified ground terminal 12. In this circuit topology, during the secondary stroke, the switching controller 6' can directly sense the converter output voltage at the BCM detection terminal DET and take action if this value becomes too high. Over-voltage protection may be provided by the same circuit within the switching controller 6' that detects demagnetization due to the high side driven topology, which may not be possible in a circuit with a low side driven topology in which an auxiliary winding may need to be used to enable sensing of an over-voltage condition.

The internal arrangement of the dimming level controller 7' (shown in the cut away section of FIG. 4) is similar to that of FIG. 2. However, in the high side buck boost switching topology the buck boost inductor is connected between the rectified ground $GND_{RECT}$ and the floating ground $GND_{FLOAT}$. Using the property that the average voltage across the inductor L_bb is small (a few volt at its maximum) compared to the magnitude of the rectified input signal, a dimming control signal that is only marginally influenced by the average voltage across the inductor can be derived by a division and low-pass filtering of the rectified voltage with respect to the floating ground. What at first appears a seemingly inconvenient property of the high-side driver, that the circuit requires two reference grounds, has been found to be addressable in a cost effective way by taking advantage of this property of the inductor. The dimming level controller 7' may therefore take the floating ground $GND_{FLOAT}$ as its reference, rather than the rectified ground $GND_{RECT}$.

In the primary stroke, the switching controller 6' closes the powers switch M1 such that a current in the inductor L_bb ramps-up during a predetermined on-time (duration of the primary stroke). After the on-time has expired, the power switch M1 is opened and the magnetic energy stored in the inductor L_bb is released. The switching controller 6' detects the end of the secondary stroke using a signal at the BCM detection terminal DET.

During the secondary stroke, the switching controller 6' determines the current that is delivered to the string of LEDs by sensing the voltage across the sense resistor Rsns. The switching controller 6' compares the sensed voltage with the dimming voltage signal received at the dimming input terminal DIM and regulates the on-time of the power switch M1 for the next switching cycle such that the delivered current matches the desired level corresponding to the dimming voltage signal.

Figure 5:
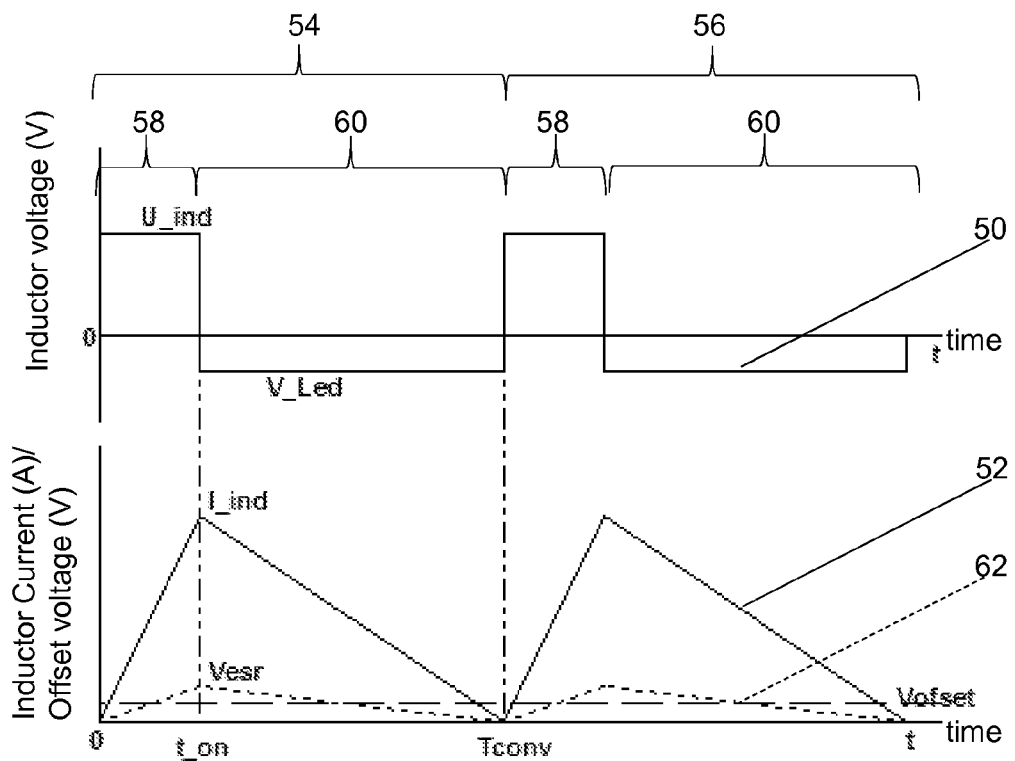
FIG. 5 illustrates signal profiles from the circuit of FIG. 4.

FIG. 5 illustrates signal profiles from the circuit of FIG. 4, including a voltage 50 across the inductor and a current 52 through the inductor as a function of time, during two high frequency switching cycles 54, 56.

The voltage 50 across the inductor has a fixed positive value in a primary stroke 58 of each switching cycle 54, 56 and a fixed negative value in a secondary stroke 60 in each switching cycle 54, 56. The time-averaged voltage across an entire switching cycle 54, 56 is, for an ideal inductor, 0 V.

The inductor current 52 shown is typical of a SMPS operating in boundary conduction mode; the current in the inductor linearly increases from zero to a maximum value I_ind during the primary stroke 58 and falls from the maximum value I_ind to 0 A during the secondary stroke 60.

The next switching cycle 56 commences once the current 52 has fallen to zero at the end of the secondary stroke 60 of the previous switching cycle 54.

The inductor current 52 is positive for the primary stroke 58 and the secondary stroke 60, and so the average inductor current will cause an offset voltage 62 across the buck boost inductor in the non-ideal case where the inductor has a series resistance, ESR. The size of the offset voltage 62 is proportional to the inductor current 52. In the example of FIG. 4, any ESR offset voltage is subtracted from the rectified voltage signal because the voltage divider that is used to derive the average dimming voltage signal is referenced to the IC ground (floating ground). The voltage level across the ESR is about the same order of magnitude as a diode drop voltage and therefore typically very small compared to the rectified voltage signal which may be of the order of a hundred volts. Since the dimming level controller features a voltage divider (the division factor may be, for example, 1/100) taking the ground of the switch controller as reference, the voltage difference between the dimming voltage signal output of dimming level controller of FIG. 2 and the dimming voltage signal output of dimming level controller of FIG. 4 may therefore be neglected, and considered acceptable, in some applications.

Figure 6:
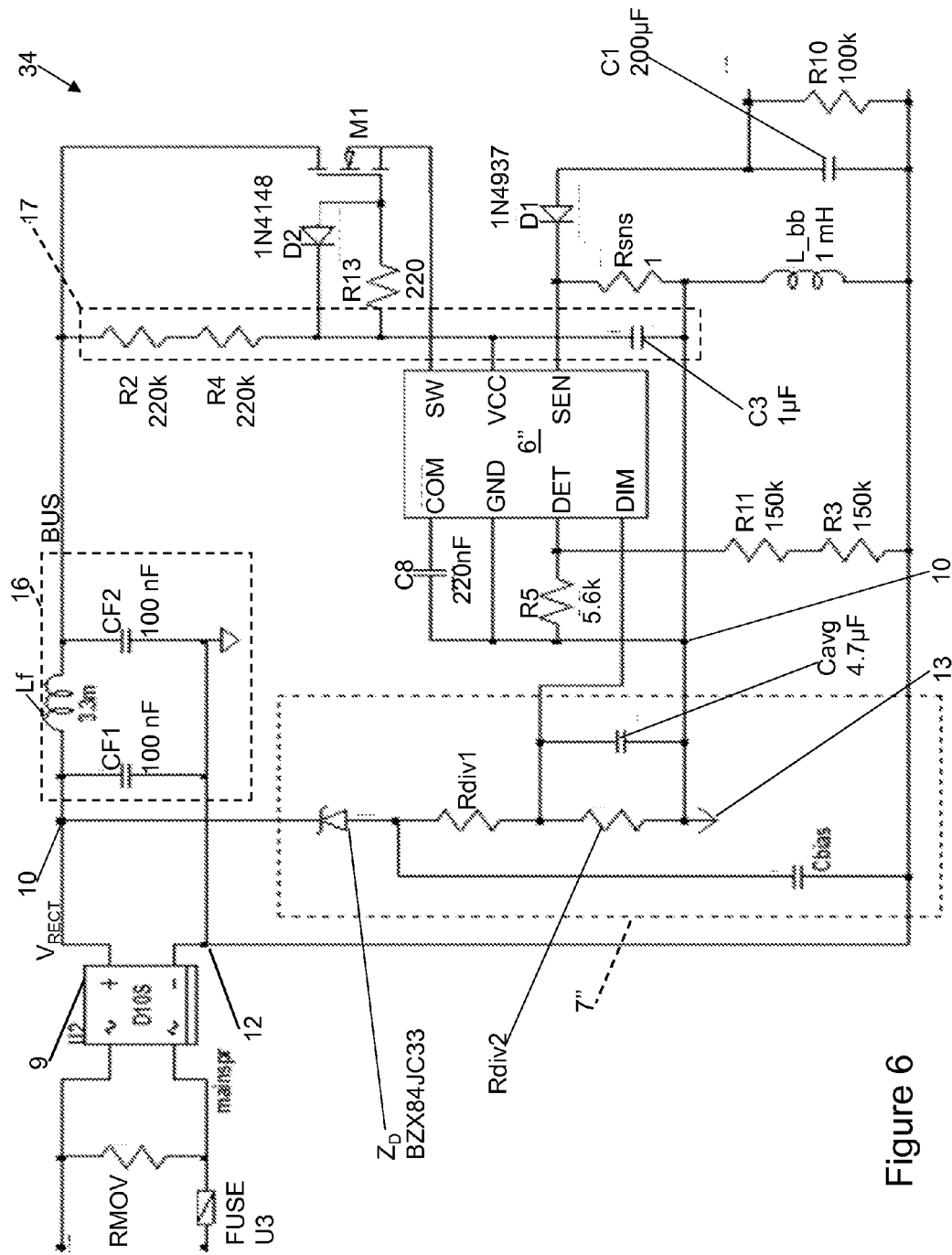
FIG. 6 illustrates another schematic of a high side buck-boost dimmer converter similar to that of FIG. 3.

FIG. 6 illustrates another schematic of a high side buck-boost dimmer converter, SMPS, 34 similar to that of FIG. 4. For the most part, similar features between the circuits of FIGS. 4 and 6 will not be discussed further below.

A filtering circuit 16 similar to that described with reference to FIG. 2 is provided in the SMPS 34. The second conditioning capacitor CF2 is connected between a second terminal of the conditioning inductor Lf and the rectified ground terminal 12. Additional conditioning circuit components 17 are provided to connect the IC voltage terminal Vcc to the rectified voltage terminal 10. Supply resistors R2, R4 are provided in series between the IC voltage terminal Vcc and the second terminal of the conditioning inductor Lf. For 230V mains, two supply resistors R2, R4 are used to handle the high mains voltage. A buffer capacitor C3 is provided between the IC voltage terminal Vcc and the floating ground terminal 13.

The switch controller 6" has a switch terminal SW, rather than a gate terminal, in addition to the terminals discussed with regard to the controller of FIG. 4. The power switch M1 has a drain connected to the rectified voltage terminal 10 and a source connected to the switch terminal SW. The sense resistor Rsns and the inductor L_bb are provided in series between the rectified ground terminal 12 and the sense terminal SEN of the controller 6". A conduction channel of the power switch M1 (between its source and drain) is therefore provided in series with the inductor L_bb via a second switching device within the switch controller 6".

Rather than driving the gate of the switching device M1 from the switch controller 6", the switch controller 6" in this example uses so-called "source switching", in which the gate of the power switch M1 is connected to a fixed voltage and a second switching device is put in series between the source of power switch M1 and the sense resistor Rsns. The second switching device resides inside the switch controller 6" and receives a gate signal very similar to the gate signal as in the example of FIGS. 2 and 4. The current through M1 will only flow when the second switch is conducting. An advantage of a source switching topology is that the current consumption of the switch controller may be drastically reduced (by for example a factor of 10). The reduction in current consumption is because at turn-on of the switch, the gate charge required for the power switch M1 to start conducting is supplied from the buffer capacitor C3 while at turn-off it is transferred back to the buffer capacitor C3. Note that in the switch topologies in FIG. 2, at each turn-off, the gate charge is lost to ground. The switch controller 6" of FIG. 6 still needs to supply the gate charge for the second switch to turn-on, but since this comprises a low-voltage switch, the amount of energy required may be orders of magnitude lower.

The dimming level controller 7" comprises a Zener diode $Z_D$ and a potential divider connected in series between the rectified voltage terminal 10 and the rectified ground terminal 12. The potential divider has a first divider resistor Rdiv1 and a second divider resistor Rdiv2. The first divider resistor Rdiv1 is provided between the Zener diode $Z_D$ and the second divider resistor Rdiv2. A voltage is subtracted from the phase-cut rectified voltage $V_{RECT}$ by the Zener diode $Z_D$.

In this example, the maximum value for the dimming voltage signal $V_{DIM}$ is set at 2 V. The potential divider further reduces and adapts the phase-cut rectified voltage to the voltage rating of the dimming input terminal DIM of the switching controller 6".

An averaging capacitor Cavg is connected in parallel with the second divider resistor Rdiv2. A first plate of the averaging capacitor Cavg is connected to a node between the first divider resistor Rdiv1 and the second divider resistor Rdiv2. The dimming voltage signal $V_{DIM}$ is provided at the first plate of the averaging capacitor Cavg as the voltage across the parallel arrangement of the averaging capacitor Cavg and the second divider resistor Rdiv2, with reference to the floating ground terminal 13.

The average voltage on the dimming voltage signal $V_{DIM}$ is:

$$V_{dimavg} = \sqrt{2} \cdot V_{mains} \cdot \frac{R_{div1}}{R_{div1} + R_{div2}} \cdot \frac{\cos\varphi - \cos\pi - \alpha}{\pi} - \frac{\pi - \alpha - \varphi \cdot \frac{V_Z + 2 \cdot V_D + V_{ESR}}{\sqrt{2} \cdot V_{mains}}}{\pi}$$

where $$\alpha = \sin^{-1}\frac{V_Z + 2 \cdot V_D + V_{ESR}}{\sqrt{2} \cdot V_{mains}},$$

α≤φ≤180,
φ represents the dimmer phase cut angle,
$V_{mains}$ is the rms line voltage at the input terminals 8,
$V_D$ is the voltage dropped by the bridge rectifier 9,
$V_Z$ is Zener stand-off voltage, and
$V_{ESR}$ is the voltage dropped over the ESR of the buck boost inductor:
$V_{ESR} = I_{avg\_LED} \cdot ESR_{L\_bb}$.

The dimming level controller 7" also comprises a bias capacitor Cbias in this example. The bias capacitor Cbias has a first plate and a second plate. The first plate of the bias capacitor Cbias is connected to a node between the potential divider (more particularly the first divider resistor Rdiv1) and the Zener diode $Z_D$ and the second plate is connected to the rectified ground terminal 12.

The function of the bias capacitor Cbias is to create a continuous forward current in the Zener diode and so enable a constant Zener voltage drop to be provided. Also, the bias capacitor Cbias blocks the lower frequency rectified voltage of the mains and therefore additional losses from the Zener diode $Z_D$ may be minimized.

An additional compensation terminal COM (which relates to the RC pin of NXP's integrated circuit number SSL2101, for example) is connected to the floating ground terminal 13 by a filter capacitor C8 in order to stabilize the feedback loop. The BCM detection terminal DET of the switching controller 6" is connected to the inductor L_bb via a first detection resistor R5 and to the rectified ground by second detection resistors R3, R11.

As a further option, an additional resistor (not shown) may be connected between the dimming input terminal DIM of the switching controller 6" and a reference voltage source $V_{ref}$ (not shown) in order to provide a fixed offset to the dimming voltage signal. The reference voltage $V_{ref}$ may be provided with respect to the floating ground $GND_{FLOAT}$. The fixed offset may increase the current consumption from the dimmer at a low dimmer conduction angle, which may improve the stability of the dimmer. The fixed offset can create a minimum dim level to clip the dimming voltage signal at a lowest dimming setting.

Figure 7:
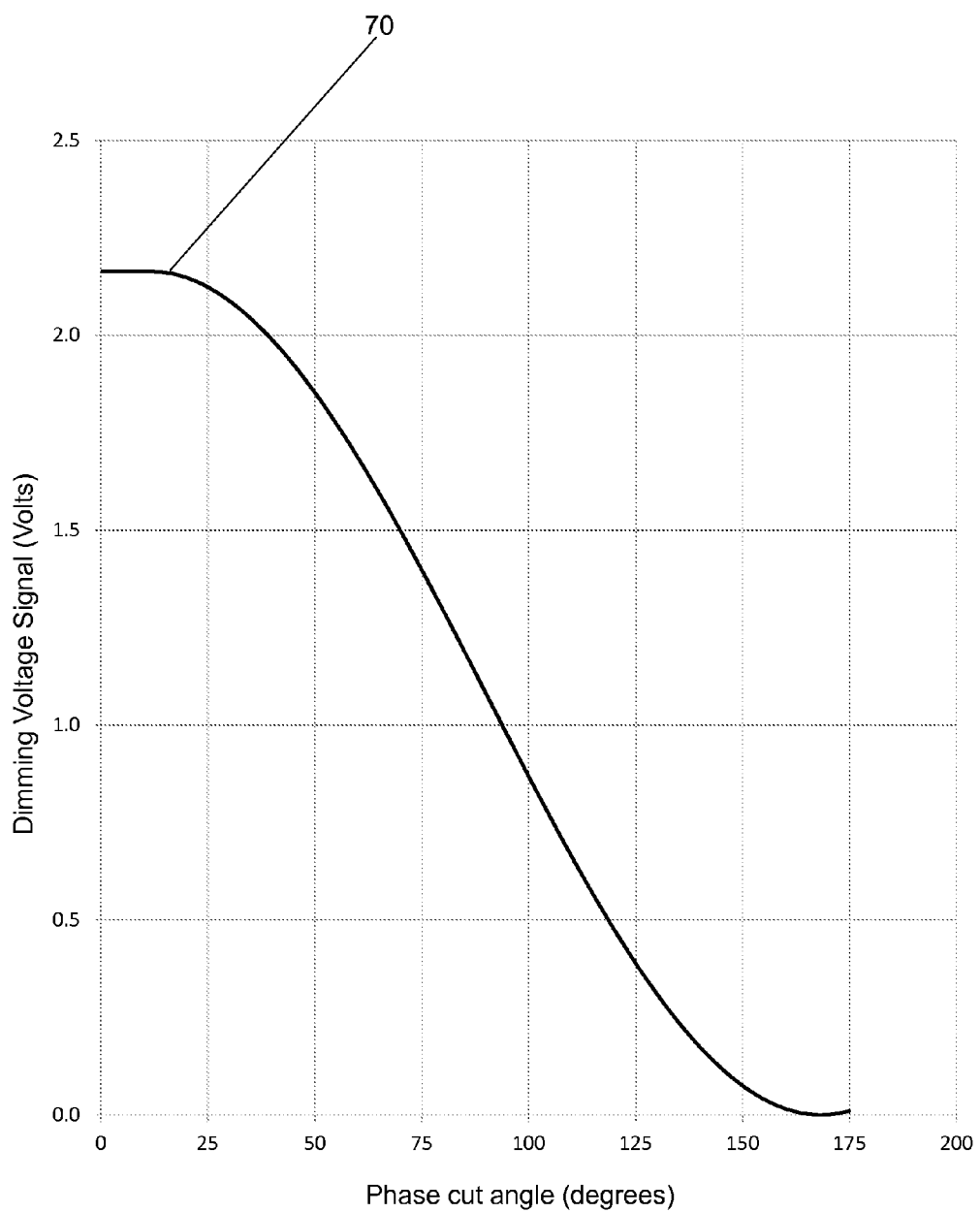
FIG. 7 illustrates a dimmer control voltage curve against phase cut angle set by the buck-boost dimmer converter of FIG. 6.

FIG. 7 illustrates a dimming voltage signal curve 70 against phasecut angle, as can be set by the buck-boost dimmer converter of FIG. 6. The dimming voltage signal curve 70 relates to the following operating conditions of the circuit of FIG. 6: 120V AC mains, $R_{div1}$=24 k, $R_{div2}$=820 k, $V_Z$=33V, $V_D$=0.56, $V_{ESR}$=0 (ESR ~0 ohm, $V_{ESR} \ll V_{mains}$). The first 35 degrees of the phase cut voltage on the dim pin is greater than 2V. This compensates for line voltage fluctuations down to 20% of the nominal mains and allows them to pass through as a voltage dimming signal.

It will be appreciated that the arrangement disclosed herein may relate to a flyback converter, instead of a buck-boost converter. For example, the disclosure also relates to a flyback converter comprising:

a rectified voltage terminal and a rectified ground terminal for receiving a phase-cut rectified voltage;
a transformer with a primary winding;
a power switch connected in series with the primary winding between the rectified voltage terminal and the rectified ground terminal;
a switch controller having a floating ground terminal and a dimming input terminal, wherein the dimming input terminal is for receiving a dimming voltage signal indicative of a required dimming level, wherein the switch controller is configured to control the switch in accordance with the dimming voltage signal and wherein the primary winding is connected between the rectified ground terminal and the floating ground terminal; and
a dimming level controller configured to set the dimming voltage signal in accordance with the rectified phase-cut voltage with respect to the floating ground terminal.

It will be appreciated that any components that are described or illustrated herein as being coupled or connected could be directly or indirectly coupled or connected. That is, one or more components could be located between two components that are said to be coupled or connected whilst still enabling the required functionality to be achieved.

The invention claimed is:

1. A switched mode power supply, comprising:
a rectified voltage terminal and a rectified ground terminal for receiving a phase-cut rectified voltage;
a power switch and an inductive element connected in series between the rectified voltage terminal and the rectified ground terminal;

a switch controller having a floating ground terminal and a dimming input terminal, wherein the dimming input terminal is for receiving a dimming voltage signal indicative of a required dimming level, wherein the switch controller is configured to control the switch in accordance with the dimming voltage signal and wherein the inductive element is connected between the rectified ground terminal and the floating ground terminal; and a dimming level controller configured to set the dimming voltage signal as an average of a portion of the rectified phase-cut voltage with respect to the floating ground terminal over one or more half cycles of the phase-cut rectified voltage.

2. The switched mode power supply of claim 1, wherein the dimming voltage signal is provided with reference to the floating ground.

3. The switched mode power supply of claim 1, further comprising a potential divider with a first divider resistor and a second divider resistor, wherein the potential divider is connected in series between the rectified phase-cut voltage terminal and the floating ground terminal, and wherein the dimming voltage signal is available at a node between the first divider resistor and the second divider resistor.

4. The switched mode power supply of claim 3, further comprising a Zener diode and an averaging capacitor connected in series between the rectified phase-cut voltage terminal and the floating ground terminal, the averaging capacitor having a first plate and a second plate, wherein the second plate is connected to the floating ground terminal, the first plate is connected to the first divider resistor, the first divider resistor is provided in series with, and between, the Zener diode and the averaging capacitor, and the second divider resistor is connected in parallel with the averaging capacitor.

5. The switched mode power supply of claim 3, further comprising a bias capacitor with a first plate and a second plate, the first plate of the bias capacitor connected to a junction between the Zener diode and the first divider resistor and the second plate of the bias capacitor connected to the rectified ground terminal.

6. The switched mode power supply of claim 1, wherein the average dimming voltage signal is:

$$V_{dim(avg)} = \sqrt{2} \cdot V_{mains} \cdot \frac{R_{div1}}{R_{div1} + R_{div2}} \cdot \left( \frac{\cos\varphi - \cos(\pi - \alpha)}{\pi} - \frac{(\pi - \alpha - \varphi) \cdot \left(\frac{V_Z + 2 \cdot V_D + V_{ESR}}{\sqrt{2} \cdot V_{mains}}\right)}{\pi} \right)$$

where $$\alpha = \sin^{-1}\left(\frac{V_Z + 2 \cdot V_D + V_{ESR}}{\sqrt{2} \cdot V_{mains}}\right),$$

$\alpha \leq \phi \leq 180$, $\phi$ represents a dimmer phase cut angle, $V_{mains}$ is a root mean squared line voltage at the input terminals, $V_D$ is a voltage dropped by a bridge rectifier, $V_Z$ is a Zener stand-off voltage and $V_{ESR}$ is the voltage dropped over the inductive element.

7. The switched mode power supply of claim 1, further comprising an additional resistor connected between the dimming input terminal and a reference voltage in order to provide a fixed offset to the dimming voltage signal.

8. The switched mode power supply of claim 1, further comprising filtering circuitry connected between the power switch and the rectified voltage terminal or between the rectified voltage terminal and the rectified ground terminal.

9. The switched mode power supply of claim 1, wherein the inductive element has a resistance between 0.1 and 20 ohms.

10. The switched mode power supply of claim 1, comprising a buck-boost converter.

11. The switched mode power supply of claim 1, wherein the dimming level controller and the switching controller are provided in a single package.

12. The switched mode power supply of claim 11, wherein the power switch is also provided in the single package.

13. A solid state lighting unit comprising the switched mode power supply of claim 1.

* * * * *